US008944368B2

(12) United States Patent
Elliot et al.

(10) Patent No.: US 8,944,368 B2
(45) Date of Patent: Feb. 3, 2015

(54) AIRCRAFT STEERING ACTUATOR

(75) Inventors: Nicholas Elliot, Winscombe (GB); Arnaud Didey, Portsmouth (GB)

(73) Assignee: Airbus Operations Limited, Bristol (GB)

( * ) Notice: Subject to any disclaimer, the term of this patent is extended or adjusted under 35 U.S.C. 154(b) by 104 days.

(21) Appl. No.: 13/010,311

(22) Filed: Jan. 20, 2011

(65) Prior Publication Data

US 2011/0180658 A1    Jul. 28, 2011

(30) Foreign Application Priority Data

Jan. 26, 2010  (GB) .................................. 1001175.7

(51) Int. Cl.
*B64C 25/50*  (2006.01)
*B62D 5/04*  (2006.01)

(52) U.S. Cl.
CPC ...................................... *B64C 25/50* (2013.01)
USPC ........................ 244/50; 244/103 R; 180/444

(58) Field of Classification Search
USPC ............ 244/50, 100 R, 103 R; 180/444, 414; 280/92, 93.502, 93.513, 771
See application file for complete search history.

(56) References Cited

U.S. PATENT DOCUMENTS

| 2,099,489 | A |   | 11/1937 | Lambert |         |
|-----------|---|---|---------|---------|---------|
| 2,460,387 | A |   | 2/1949  | Hunter  |         |
| 2,622,827 | A | * | 12/1952 | Hayman et al. | 244/50 |
| 2,830,562 | A |   | 4/1958  | Hogan   |         |
| 2,919,084 | A | * | 12/1959 | Lovell  | 244/50  |
| 2,979,034 | A |   | 4/1961  | Geyer   |         |
| 3,365,974 | A | * | 1/1968  | Lieberman | 74/425 |
| 3,523,599 | A |   | 8/1970  | Denkowski |       |
| 3,643,898 | A | * | 2/1972  | Whitener et al. | 244/50 |
| 3,753,540 | A | * | 8/1973  | Renner  | 244/50  |
| 3,865,170 | A |   | 2/1975  | Mitchell |        |
| 4,217,788 | A |   | 8/1980  | Burr et al. |      |
| 4,265,417 | A | * | 5/1981  | Watts   | 244/50  |
| 4,542,809 | A |   | 9/1985  | Crossman |        |
| 4,567,967 | A |   | 2/1986  | Crossman |        |
| 4,653,706 | A | * | 3/1987  | Ragiab  | 244/110 E |
| 4,986,493 | A |   | 1/1991  | Sarh    |         |
| 5,107,967 | A |   | 4/1992  | Fujita et al. |     |

(Continued)

FOREIGN PATENT DOCUMENTS

EP    1857705 A1    11/2007
GB    812589         4/1959

(Continued)

OTHER PUBLICATIONS

Nice, Karim, "How Car Steering Works", accessed Oct. 10, 2012, copyrighted 2001, howstuffworks.com, http://auto.howstuffworks.com/steering3.htm.*

(Continued)

*Primary Examiner* — Tien Dinh
*Assistant Examiner* — Michael Wang
(74) *Attorney, Agent, or Firm* — Lowe Hauptman & Ham, LLP

(57) ABSTRACT

An aircraft steering actuator has a driving shaft for connection to a drive source, the driving shaft defining a first axis, and a driven shaft for substantially perpendicular connection to a landing gear axle of an aircraft, the driven shaft defining a driven axis substantially perpendicular to the first axis, in which the driving shaft and driven shaft are connected in driving engagement by a ball-worm gear.

10 Claims, 5 Drawing Sheets

(56) References Cited

U.S. PATENT DOCUMENTS

| | | | |
|---|---|---|---|
| 5,492,348 A * | 2/1996 | Shaw et al. | 180/413 |
| 5,765,668 A | 6/1998 | Hasselberg et al. | |
| 5,809,833 A | 9/1998 | Newport et al. | |
| 5,988,311 A * | 11/1999 | Kuribayashi et al. | 180/444 |
| 6,259,175 B1 | 7/2001 | Alfano et al. | |
| 6,581,730 B1 | 6/2003 | Haydon et al. | |
| 6,662,672 B2 | 12/2003 | Someya | |
| 6,670,734 B2 | 12/2003 | Morishima et al. | |
| 6,786,451 B2 * | 9/2004 | Courtois et al. | 244/102 R |
| 6,810,985 B1 | 11/2004 | Budaker et al. | |
| 6,978,868 B2 | 12/2005 | Schautt | |
| 7,641,145 B2 | 1/2010 | Steinberg | |
| 8,109,163 B2 | 2/2012 | Hudson et al. | |
| 2005/0056499 A1 | 3/2005 | Narcy et al. | |
| 2005/0284249 A1 | 12/2005 | Arnone | |
| 2006/0081078 A1 | 4/2006 | Nagai et al. | |
| 2006/0156845 A1 | 7/2006 | Tong | |
| 2007/0137329 A1 | 6/2007 | Everson et al. | |
| 2007/0241230 A1 | 10/2007 | Bucheton et al. | |
| 2007/0261506 A1 | 11/2007 | Ymker | |
| 2008/0098835 A1 | 5/2008 | Cheng | |
| 2010/0096498 A1 | 4/2010 | McKay | |
| 2010/0219290 A1 | 9/2010 | Luce | |
| 2010/0282901 A1 | 11/2010 | Mason | |
| 2011/0179893 A1 | 7/2011 | Elliott et al. | |

FOREIGN PATENT DOCUMENTS

| | | |
|---|---|---|
| GB | 1018871 | 2/1966 |
| GB | 1287099 | 8/1972 |
| GB | 1416806 | 12/1975 |
| WO | 2009125213 A2 | 10/2009 |

OTHER PUBLICATIONS

UK Search Report for GB1001175.7 mailed May 18, 2010.
UK Search Report for GB1001175.7 mailed Aug. 11, 2010.
UK Search Report for GB1001176.5 mailed May 18, 2010.
UK Search Report for GB1001177.3 mailed May 18, 2010.

* cited by examiner

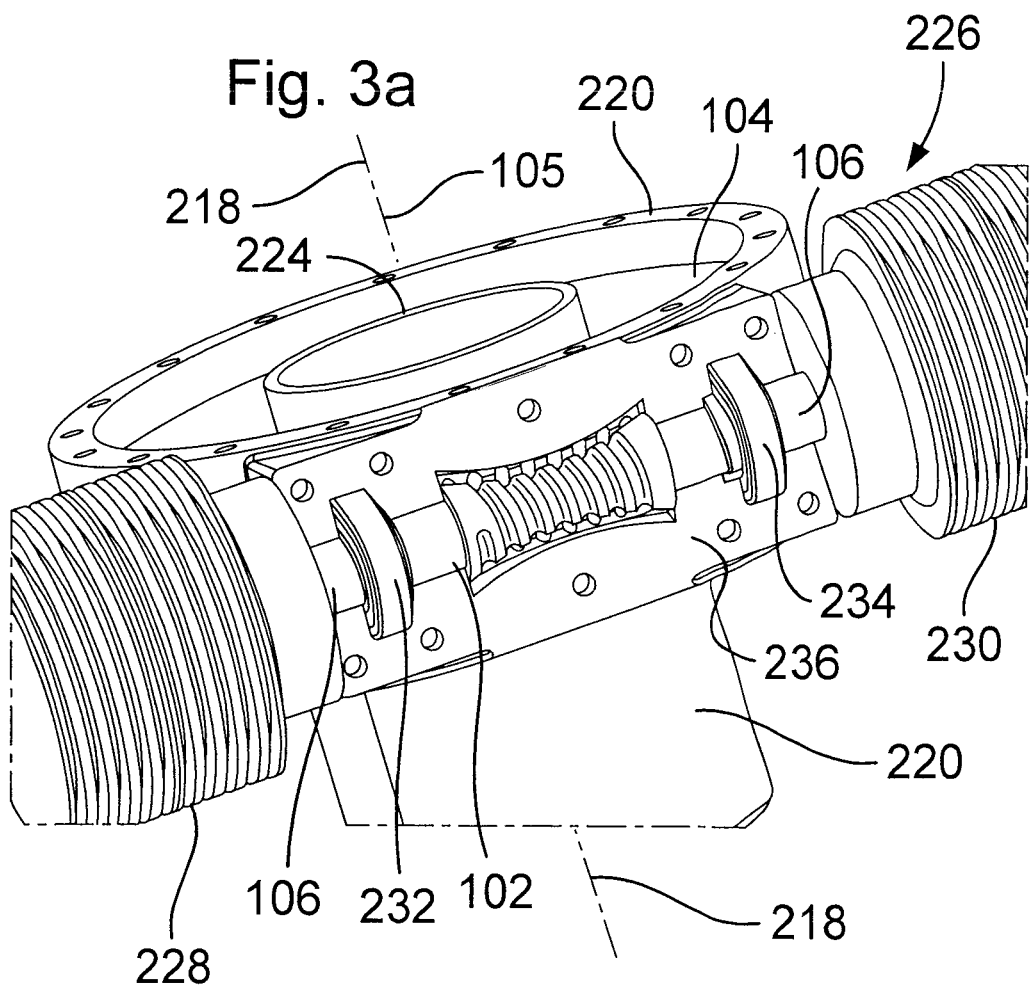
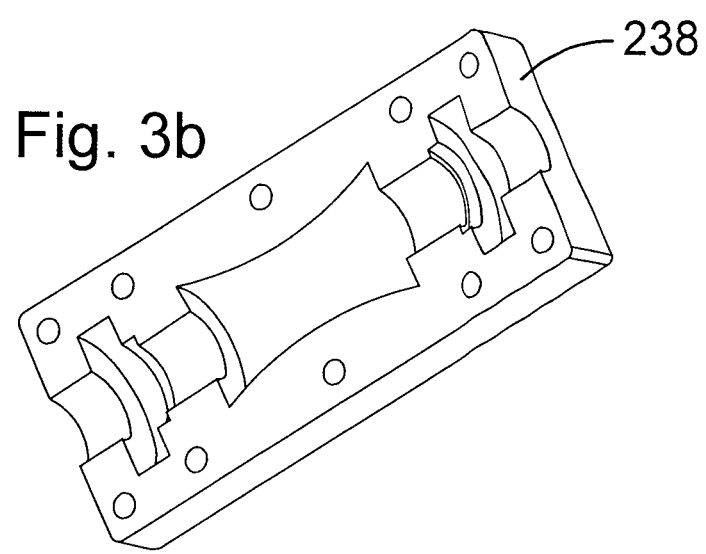

AIRCRAFT STEERING ACTUATOR

RELATED APPLICATIONS

The present application is based on, and claims priority from, Great Britain Application Number 1001175.7, filed Jan. 26, 2010, the disclosure of which is hereby incorporated by reference herein in its entirety.

The present invention relates to an aircraft steering actuator. In particular, the present invention relates to an aircraft steering actuator comprising a ball-worm drive.

Aircraft need to be steered when taxiing on the ground. Typically this is achieved by rotating the front landing gear about a vertical axis in order to change the direction of the aircraft whilst taxiing. In some situations, the aircraft may be towed.

Electric motors are used to provide power to steer the wheels of the nose landing gear. Because the landing gear assemblies are heavy on commercial aircraft and the weight of the aircraft results in significant friction between the wheels and the ground, a significant amount of torque is required to turn the wheels. Torque values in the order of 7 kNm are required even for medium sized passenger aircraft. On the other hand, the speed at which the wheels are turned is not required to be high. Therefore, a motor with a low torque, high speed output can be geared to produce the required torque at low speeds.

In the design of steering actuators, it is important that the steered wheels can be free to turn as a result of external forces in certain situations. For example, when the aircraft is being towed, or taking off or landing, it is necessary for the wheel to be able to back drive the steering actuator to prevent damage to the wheel and/or drive system due to the high forces acting upon the system.

In known systems, large gearboxes are used to provide the required gear reduction. Such systems are heavy and complex, requiring redundancies in case of mechanical failure. Alternative gear types such as flex splines, although compact and relatively simple, are not easily back driven and hence must be decoupled with a clutch. Clutches of this size (able to handle the significant torque requirements) are large, complex and heavy. Therefore they present further problems in terms of weight and reliability.

Known gearing systems also have the disadvantage that they form part of the nose landing gear load path; i.e. they are an integral part of the landing gear. This is disadvantageous because the aircraft needs to be jacked up in order to change or service the steering actuator.

It is an aim of the present invention to provide an improved aircraft steering actuator.

According to a first aspect of the invention there is provided an aircraft landing gear steering actuator comprising, a first shaft for transverse connection to a drive source, the first shaft defining a first axis, and, a second shaft for connection to a landing gear axle of an aircraft, the second shaft defining a second axis transverse to the first axis, in which the first shaft and second shaft are connected in driving engagement by a ball-worm gear.

The use of a ball worm gear provides a relatively simple arrangement which is reliable, provides the desired gear reduction in a single stage and can be back driven, thus obviating the need for a clutch. Ball worm gears are also generally more efficient than known gearing arrangements in this field.

According to a second aspect of the invention, there is provided an aircraft steering assembly comprising; a housing, a steering shaft for connection substantially perpendicularly to a landing gear axle of an aircraft, and rotatable relative to, and substantially within, the housing, the steering shaft comprising an external formation for the transmission of torque thereto, and, in which the housing substantially surrounds the steering shaft and defines an aperture to allow mechanical engagement between a steering drive and the external formation.

The aforementioned arrangement permits easy removal of the actuator without having to jack the aircraft. This is because the actuator and its gearing does not form part of the load path. This is useful, for example for servicing the aircraft steering actuator, or for providing a replacement actuator without significant lost time.

An example aircraft steering actuator in accordance with the present invention will now be described with reference to the accompanying drawings in which:

FIG. 1b is a part of the ball-worm assembly of FIG. 1a,

FIG. 1c is a further part of the ball-worm assembly of FIG. 1a,

Figure 2A:
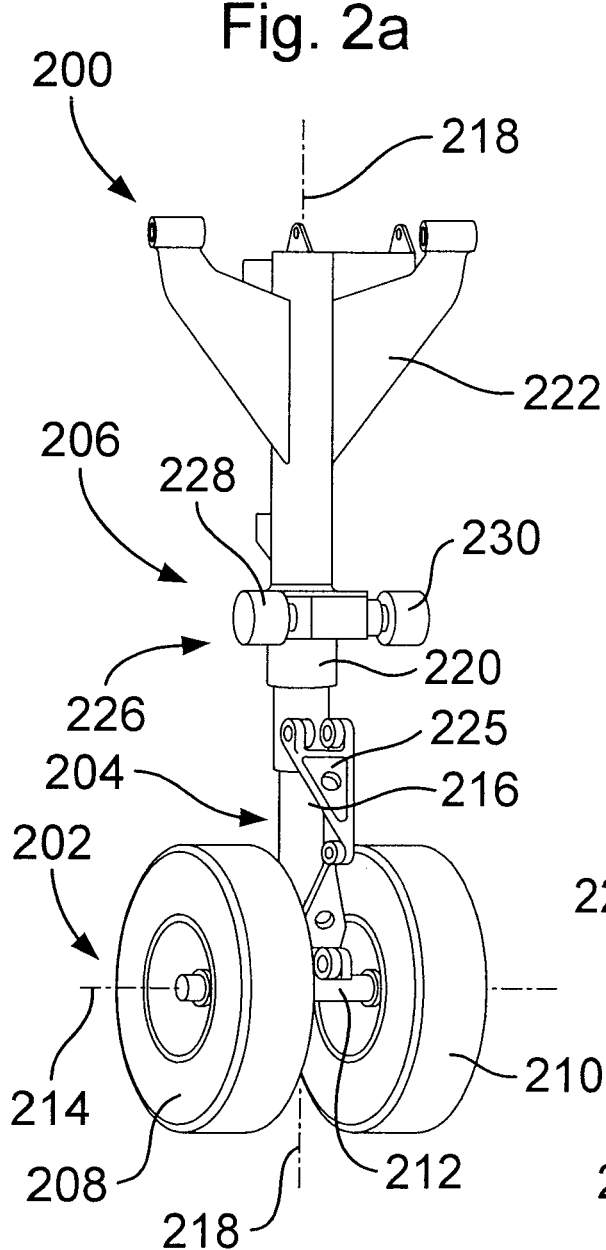
Figure 2B:
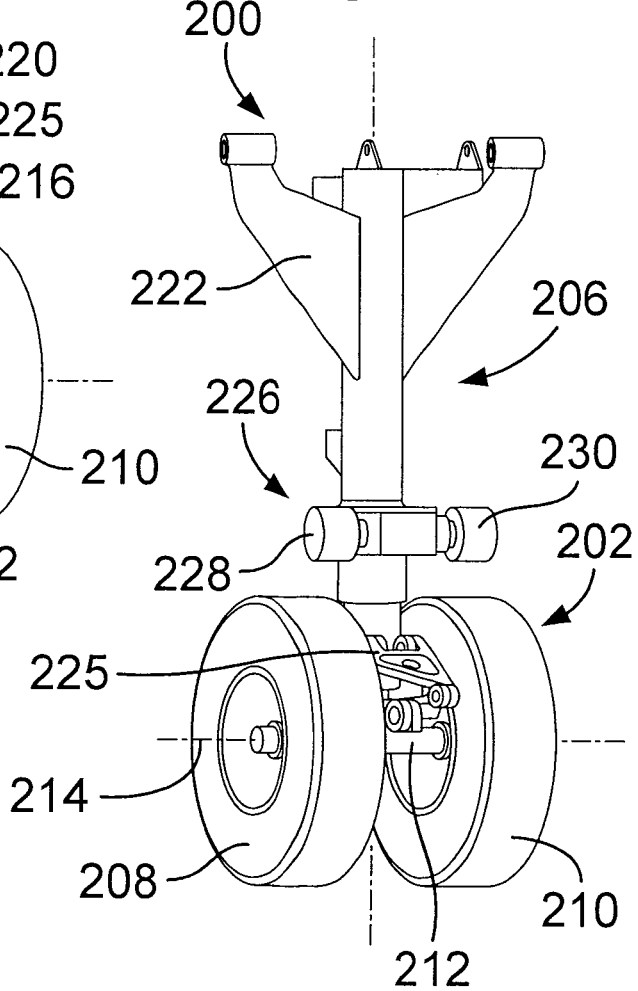
Figure 4A:
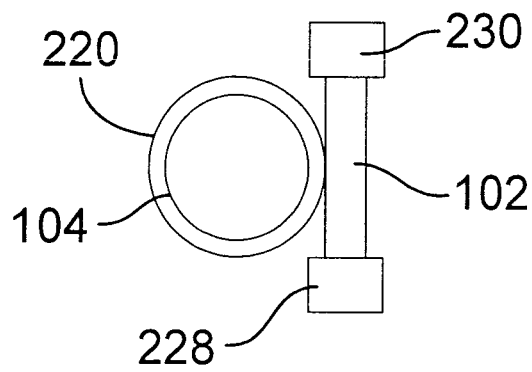
Figure 4B:
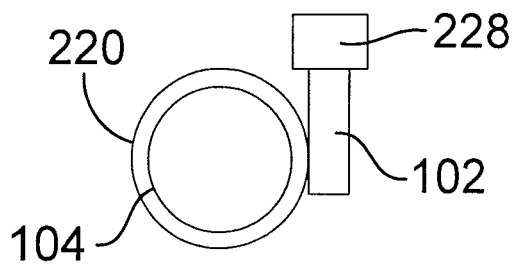
Figure 4C:
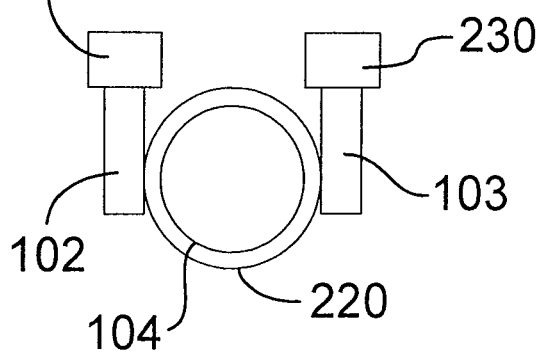
Figure 4D:
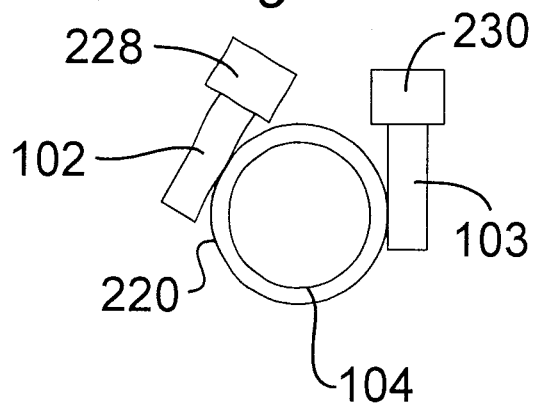
Figure 4E:
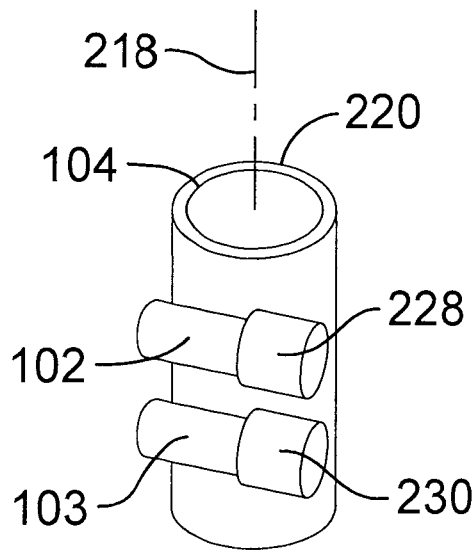

FIG. 2a is a perspective view of a first embodiment of a nose landing gear having a steering actuator according to the present invention in an extended state, FIG. 2b is a perspective view of a nose landing gear having a steering actuator according to the present invention in a retracted state, FIG. 3a is a perspective view of the steering actuator of FIG. 2a with the actuator cover removed, FIG. 3b is a perspective view of the cover of the steering actuator of FIG. 2a, FIG. 4a is a schematic plan of a part of the nose landing gear of FIG. 2a, FIG. 4b is a schematic plan of a second embodiment of a nose landing gear in accordance with the present invention, FIG. 4c is a schematic plan of a third embodiment of a nose landing gear in accordance with the present invention, FIG. 4d is a schematic plan of a fourth embodiment of a nose landing gear in accordance with the present invention, and, FIG. 4e is a schematic plan of a fifth embodiment of a nose landing gear in accordance with the present invention.

Figure 1A:
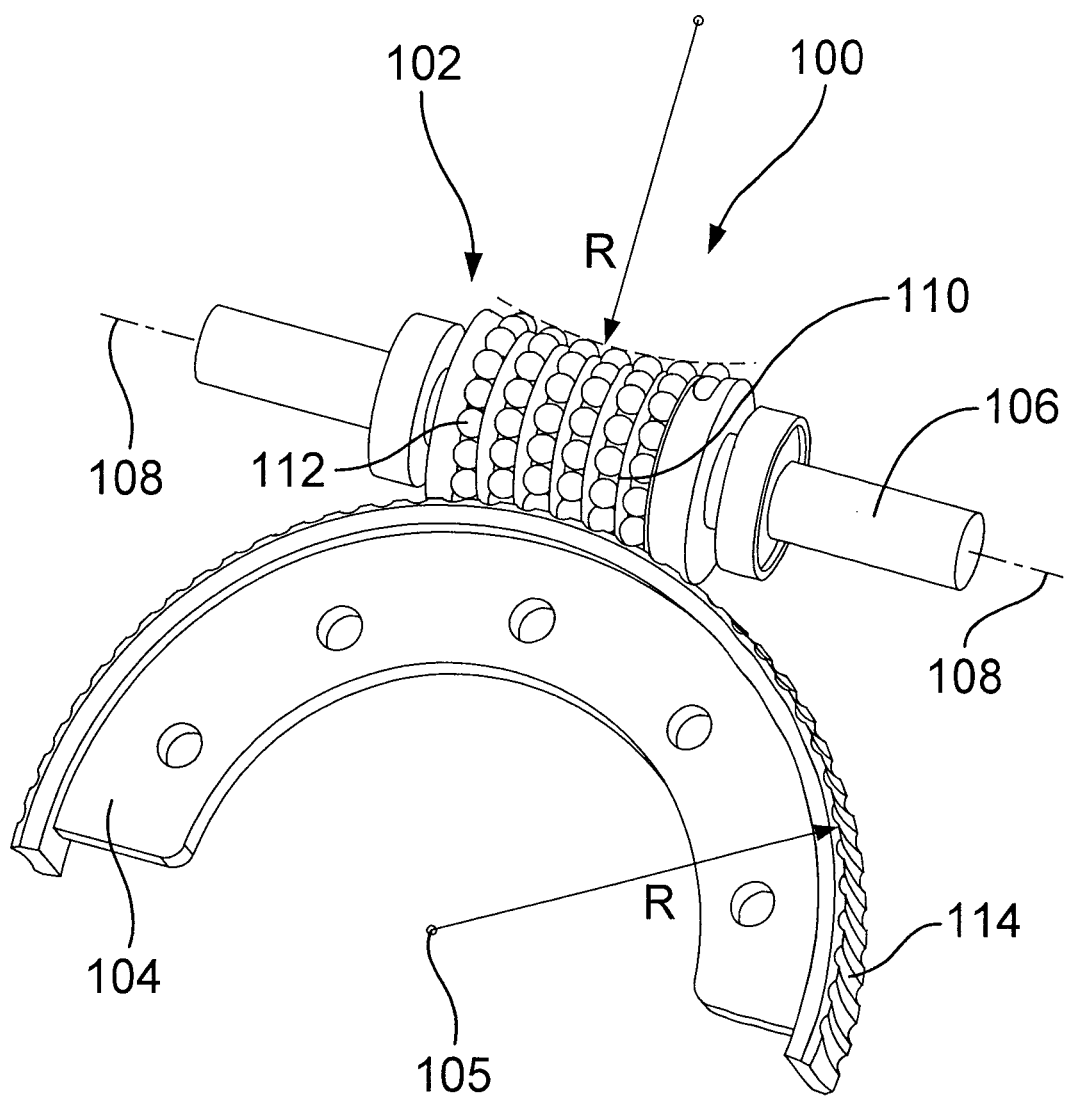
FIG. 1a is a perspective view of a ball-worm assembly.
Figure 1B:
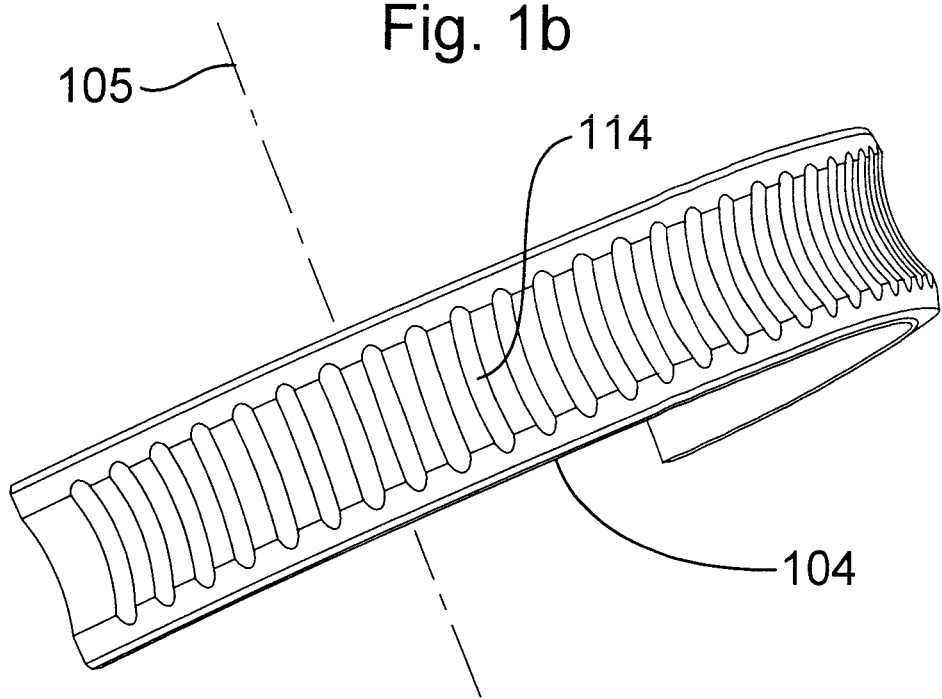
Figure 1C:
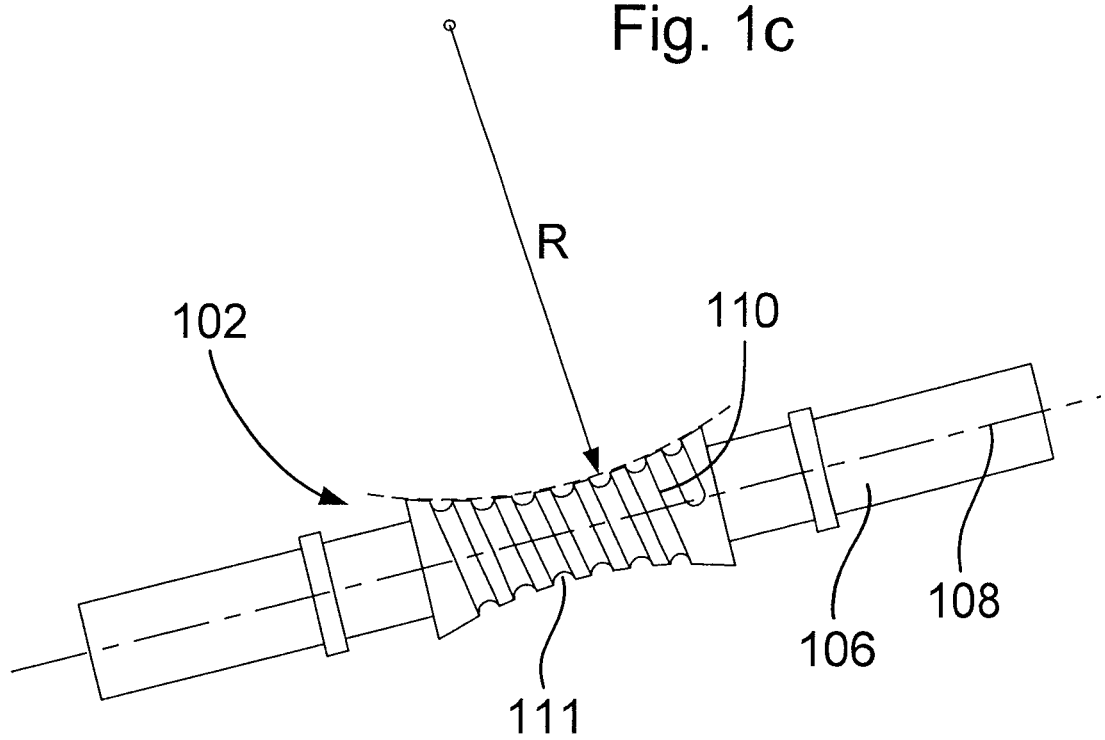

A ball-worm assembly 100 used in the present invention is shown in FIG. 1. The assembly comprises a driving shaft assembly 102 and a driven shaft 104. The driving shaft assembly 102 (also shown in FIG. 1c) comprises a driving shaft 106 defining a driving axis 108. A ball race 110 is attached to the driving shaft 106. The ball race is generally rotationally symmetric and defines a concave outer profile with radius R. A helical ball channel 111 surrounds the ball race 110 about the driving axis 108. A plurality of bearing balls 112 sit within the channel and are encased by a housing (not shown) so that they can move only along the path defined by the channel. The housing includes a recirculation system to provide the balls 112 with the ability to move along the channel in use.

The driven shaft 104 has an outer radius R and defines a driven axis 105. The driven shaft 104 defines a series of axial ball tracks 114 on its outer surface. When the race 110 and the driven shaft 114 are placed in close proximity, the channel and the tracks 114 define a path for the balls 112.

When the driving shaft is rotated, a circumferential force about driven axis 105 is applied to the axial ball tracks 114 of the driven shaft 104 by the balls 112 because they move in a helical path around the ball race 110. Torque is therefore transmitted through the race 110 to the balls 112 and consequently to the driven shaft 104. The ball-worm gear 100 provides a gear reduction from the driving shaft 106 to the driven shaft 104 and transfers the drive through 90 degrees from the axis 108 to the axis 105. Therefore a high speed, low torque input from the driving shaft 106 is geared to a low speed, high torque output at the driven shaft 104.

The ball-worm gear has the advantage that it is low friction compared to traditional worm gears (due to the moving ball bearings 112), and can be back driven, unlike other gear arrangements. Therefore the driven shaft 104 can act to drive the driving shaft 106.

Turning to FIGS. 2a and 2b, an aircraft nose landing gear 200 is shown. The landing gear 200 comprises a wheel assembly 202, a lower strut assembly 204 and an upper strut assembly 206. The wheel assembly 202 comprises a pair of wheels 208, 210 connected by an axle 212 for rotation about a wheel axis 214. The axle 212 is rotatably mounted to the lower strut assembly 204.

The lower strut assembly 204 comprises a lower strut member 216 defining a vertical steering axis 218, perpendicular to the wheel axis 214. The upper strut assembly 206 comprises an upper strut casing 220 connected to a landing gear attachment 222. The gear attachment 222 is connected to an aircraft (not shown) in a known fashion for deployment and stowage.

Referring to FIG. 3a, the upper strut casing 220 is shown. Within the upper strut casing 220 an upper strut member 224 is located. The upper strut member 224 is rotatable about the steering axis 218 within the casing 220 and is mounted to the driven shaft 104 of the ball worm assembly 100 such that the driven axis 105 is coincident with the steering axis 218.

The lower strut member 216 is telescopically movable along the steering axis 218 relative to the upper strut assembly 206 to provide suspension functionality. The extreme positions of the strut assemblies can be seen by comparing FIGS. 2a and 2b. It is important to note that although the lower strut 216 and the upper strut 224 are relatively axially movable, they are rotationally fixed by a pair of torque links 225. Therefore any torque transmitted to the upper strut 224 will be carried to the lower strut 216. Landing gear suspension systems are known in the art and will not be discussed further.

An actuator assembly 226 is provided on the casing 220. The actuator assembly comprises a first motor 228 and a second motor 230 joined by the driving shaft assembly 102. The driving shaft assembly 102 is rotatably mounted in a first and second bearing arrangement 232, 234 within an actuator casing 236. The driving shaft 106 is therefore able to be driven by the motors 228, 230 to rotate. Such rotation, as described, transmits torque via the balls (not shown in FIG. 3a) of the ball-worm drive to the driven shaft 104. As this occurs, the driven shaft 104 is rotated about the axes 105, 218 to rotate the upper strut member 224, the lower strut member 216 and hence the wheels 208, 210 to steer the aircraft.

In use, the shaft assembly 102 is covered by the cover 238 shown in FIG. 3b, which comprises a recirculation system for the balls (not shown).

Because the ball-worm provides a significant gear ratio (75:1), the amount of gearing required is achieved with this arrangement alone. Therefore to provide a design torque of 7 kNm (3.5 kNm per motor), motors rated at 47 Nm torque (after losses) are sufficient. Therefore, as the required actuation speeds are low (18 deg/s) the motor can be small, thus reducing weight and improving efficiency.

Referring to FIG. 4a, a schematic of the above arrangement is shown.

Variations of the above embodiment falling within the scope of the present invention are envisaged.

Referring to FIG. 4b, an alternative arrangement is shown with a single motor 228 driving the shaft assembly 102.

Referring to FIG. 4c, an alternative arrangement is shown in which each motor 228, 230 is connected to an individual shaft assembly 102, 103.

Referring to FIG. 4d, the motors 228, 230 and shaft assemblies 102, 103 are aparallel.

Referring to FIG. 4e, the motors 228, 230 and shaft assemblies 102, 103 are parallel and offset along the axis 218.

It will be understood that ball-worm gears are generally reliable and so do not require redundancy, however it can be provided by the embodiments of 4b to 4e above.

It will also be understood that because the actuator assemblies are positioned on the outer casing of the strut housing, they can be easily removed and replaced without jacking up the aircraft.

In the above embodiments, the driven and driving shafts have been arranged perpendicularly. Further, the driven shaft has been arranged perpendicularly to the axle of the landing gear. It will be understood that this is not necessary for functioning of the invention, and the shafts need only be transverse—i.e. relatively oriented to the extent that a driving connection can be made between them. This may require the use of extra componentry—for example the mechanical formations of the ball-worm may need to be a different form, or a universal joint may need to be installed between the driven shaft and the landing gear axle.

The invention claimed is:

1. An aircraft nose landing gear comprising,
a cylindrical casing connected to an aircraft and defining a vertical steering axis;
a vertical strut comprising a strut member being rotatably disposed in the cylindrical casing for rotation about the vertical steering axis;
a wheel assembly connected to the strut member, the wheel assembly comprising a plurality of wheels rotatable about a horizontal wheel axis;
a steering actuator comprising:
an electric motor mounted to the cylindrical casing, the electric motor having an output shaft rotating on a horizontal axis; and,
a ball-worm gear comprising a driving shaft defining a concave ball race receiving art of a driven shaft wherein the output shaft of the electric motor drives the driving shaft of the ball-worm gear, and wherein the driven shaft of the ball-worm gear drives the strut member;
in which the driving shaft and the driven shaft are directly connected in driving engagement through an opening on the cylindrical casing.

2. An aircraft steering actuator according to claim 1 in which an output shaft axis is perpendicular to a strut member axis.

3. An aircraft steering actuator according to claim 1 in which the strut member is configured for perpendicular connection to the landing gear axle.

4. An aircraft steering actuator according to claim 1 in which the output shaft is adapted to be connected to a drive source at opposite ends.

5. An aircraft steering actuator according to claim 1 comprising an output shaft housing surrounding the output shaft, and a strut member housing surrounding the strut in which the output shaft and strut member housings are removably mounted to each other to disengage the ball-worm gear.

6. An aircraft steering actuator according to claim 5 comprising a motor connected in driving engagement with the output shaft, the motor being mounted to the output shaft housing.

7. An aircraft steering actuator according to claim 5 in which the strut member defines an external mechanical formation, and, the strut member housing defines an aperture to allow mechanical engagement between the ball-worm gear and the external formation.

8. An aircraft landing gear assembly comprising;

a mounting member for mounting the assembly to the aircraft, a wheel assembly comprising a wheel rotatable about an axle, an aircraft steering actuator according to claim 1 arranged to rotate the wheel assembly relative to the mounting member about the second axis.

9. An aircraft landing gear steering actuator according to claim 1, further comprising a third shaft for connection to a drive source, the third shaft defining and being rotatable around a third axis, the third shaft and the strut member being connected in driving engagement by the ball worm gear.

10. An aircraft landing gear steering actuator according to claim 9, wherein the first and third shafts are parallel.

* * * * *